United States Patent [19]
Putt et al.

[11] 3,754,450
[45] Aug. 28, 1973

[54] INTERCHANGEABLE BACKING PLATE FOR MOVABLE WALL OF A SERVOMOTOR

[75] Inventors: James B. Putt; Oswald O. Kytta, both of South Bend, Ind.

[73] Assignee: The Bendix Corporation, South Bend, Ind.

[22] Filed: Sept. 29, 1971

[21] Appl. No.: 184,773

[52] U.S. Cl. ................. 91/376, 91/369 A, 91/471, 92/99
[51] Int. Cl. ...................... F15b 9/10, F01b 19/00
[58] Field of Search ............. 91/376, 369 A, 369 B, 91/369 R; 92/99, 100, 471

[56] References Cited
UNITED STATES PATENTS

| 3,177,777 | 4/1965 | Kenrick | 91/369 A |
| 3,388,635 | 6/1968 | Hager | 91/369 A |
| 3,452,646 | 7/1969 | Abbott et al. | 91/369 A |

*Primary Examiner*—Paul E. Maslousky
*Attorney*—Leo H. McCormick, Jr. et al.

[57] ABSTRACT

A method of placing and retaining a backing plate on a valve control retaining hub of a servomotor adjacent a diaphragm.

9 Claims, 3 Drawing Figures

Patented Aug. 28, 1973

3,754,450

INVENTORS
JAMES B. PUTT
OSWALD O. KYTTA
BY
Leo H. McCormick Jr.
ATTORNEY 3,754,450

INTERCHANGEABLE BACKING PLATE FOR MOVABLE WALL OF A SERVOMOTOR

BACKGROUND OF THE INVENTION

Vacuum operated servomotors are now being used as a source of power for operating vehicular power braking systems. The size of the servomotor is directly dependent upon the weight of the vehicle to be stopped in accordance with set safety standards. In presently constructed servomotors the interiors thereof are divided into a vacuum chamber and a control chamber by a diaphragm. The diaphragm has an outer periphery attached to the housing of the servomotor and an inner periphery loosely snapped on a movable plastic hub. The plastic hub has an integral molded diaphragm plate which extends substantially to the inner diameter of the housing. A plurality of radial ribs extended from the hub opposite the face of the diaphragm to provide sufficient strength to the diaphragm plate to withstand the actuation force created across the diaphragm. As the diameter of the servomotor increases, the diaphragm plate and corresponding supporting ribs need to be increased while the interior of the hub where the control valve is located remains the same size.

SUMMARY OF THE INVENTION

We have devised a method of assembling a backing plate, which corresponds to the diameter of a servomotor, to a uniform size hub means. The backing plate having a smaller diameter central opening with an arcuate slot is tilted and slipped over a ledge on the hub means before being placed on a shoulder adjacent an arcuate support. A land on the support is matched with the arcuate slot to prevent the backing plate from rotating and damaging the diaphragm means. A diaphragm means located between the ledge and backing plate resiliently provides a uniform compressive force to urge the plate against the support.

It is therefore an object of this invention to provide a means for securing a backing plate, which corresponds to the diameter of a servomotor, to a uniform sized hub means containing an operational valve control.

It is another object of this invention to provide wall means for dividing the interior of a servomotor with a resiliently held backing plate for transferring an operational force created across a diaphragm to the hub means.

It is a further object to provide a method of attaching a backing plate to a diaphragm by a compressive force created by a diaphragm.

These and other objects will become apparent from reading this specification and viewing the drawings.

DETAILED DESCRIPTION OF THE PREFERRED EMBODIMENT

Figure 1:
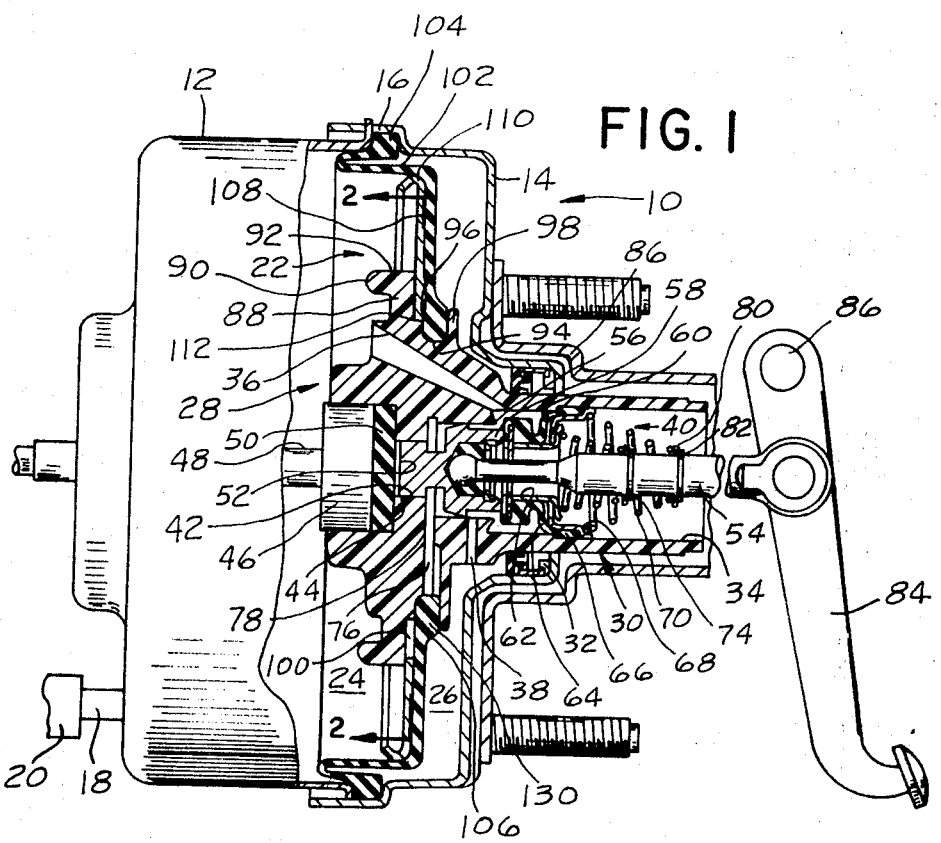
FIG. 1 is a sectional view of the internal components of a servomotor.

In the drawing shown in FIG. 1, a servomotor 10 having a front shell 12 is fixed to a rear shell 14 by a twist lock joint 16. The front shell 12 has an opening 18 wherein a check valve 20 is secured. Check valve 20 is connected to a source of partial vacuum, usually the intake manifold of a vehicle. Wall means 22 divides the interior of the servomotor 10 into a front chamber 24 and a rear chamber 26. Wall means 22 includes hub means 28 with a projection 30 which extends through a sealed opening 32 in the rear shell 14. Hub 28 has a stepped interior bore 34 with a first passage 36 connected to the front chamber 24 and a second passage 38 connected to the rear chamber 26. Plunger means 40 having a guide surface 42 is placed in a small diameter section 44 of the stepped bore 32. A cylindrical head 46 on push rod 48 is placed in the stepped bore 32 adjacent the small diameter section 44. A reaction disc 50 of a type disclosed in U.S. Pat. No. 3,110,031 is located between the cylindrical head 46 and the end 52 of the guide surface 42 of the plunger means 40.

A valve control rod 54 has a spherical end 56 attached to the plunger means 40 in a manner fully described now abandoned in U.S. application Ser. No. 128,754, filed Mar. 29, 1971 and incorporated by reference. A rearwardly facing annular atmospheric valve seat 58 on plunger means 40 surrounds the control rod 54 to provide a seat for an annular rubber poppet member 60. The annular rubber poppet member 60 surrounds a support tube 62 which transmits an actuation force to seat the poppet member 60 on the valve seat 58. The poppet member 60 has an integral flexible diaphragm portion 64 with a radial outer periphery 66 which is enlarged and held against the stepped bore 32 by a retainer ring 68. The annular poppet member 60 is biased against the atmospheric valve seat 56 by a coil spring 70 which acts on flange 72 on the support tube 62 and a first snap ring 74 positioned on the valve control rod 54. A key 76 located in a transverse slot 78 abuts the rear of guide means 42 to hold the plunger means 40 in the hub means when the valve control rod 54 is retained in the reset position as shown in FIG. 1 by a return spring 80 positioned between the retainer ring 68 and a second snap ring 82 located on the valve control rod 54.

In more particular detail, the hub means 28 has an annular vertical support 88 on the end located in the front chamber 24 with a concentric support rib 90 on the outer periphery 92. A groove 94 with a shoulder 96 concentric to periphery 92 is located between the vertical support 88 and an annular ledge 98. A land 100 is located on the shoulder 96 adjacent the transverse slot 78 which is in the bottom of groove 94.

Figure 2:
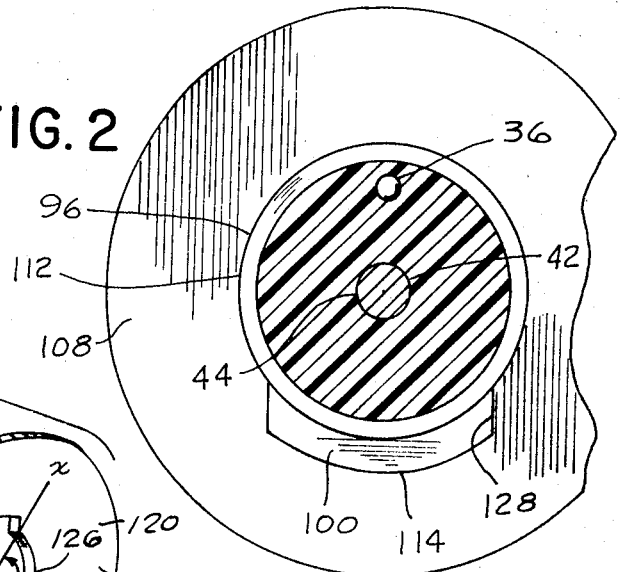
FIG. 2 is a sectional view of lines 2—2 of FIG. 1.
Figure 3:
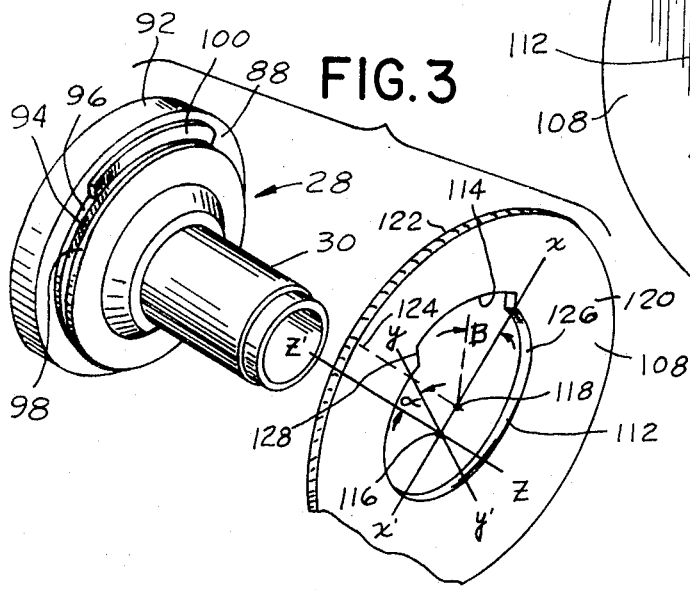
FIG. 3 is a perspective view of the hub and backing plate of FIG. 1.

The twist lock 16 holds the outer periphery 104 of a diaphragm 102 between the front 12 and the rear shell 14 while the inner periphery 106 is snapped into groove 94 to resiliently bias a backing plate 108 against the vertical support 88. The backing plate 108 has a peripheral skirt 110 secured to its external periphery to prevent damage to the diaphragm 102. The backing plate has an axial opening 112 with a concentric arcuate slot 114 which mates with shoulder 96 and land 100, see FIG. 2. Land 100 prevents the backing plate 108 from rotating on shoulder 96. The axial opening 112 has a smaller diameter than the periphery of ledge 98 and is placed on the shoulder 96 as follows:

Consider an imaginary line $y-y'$ extending through the center of the axial opening 112 and arcuate slot 114 of the backing plate as shown in FIG. 3 and line $x-x'$ intersecting at a point 116 along a line $z-z'$ which is the central axis for the hub means 28. The angle $\alpha$ formed between line $z-z'$ and $y-y'$ being approximately 90°. The vertical backing plate 108 is now shifted on line $x-x'$, to the right as shown in FIG. 3 but could equally be shifted left, to a point 118. The backing plate 108 is now rotated on its $y-y$ axis an angle B so that point 120 is tilted with respect to point 122. The tilted backing plate 108 is now moved along a line 124 which is parallel to the line $z-z'$ until point 120 contacts the vertical support 88. This tilted backing plate is now shifted back toward line $z-z'$ until point 126 contacts the bottom of groove 94 at a location equal to one-half the width 128 of the slot 114 off of line $x-x'$. The backing plate is now pivoted around point 126 which permits ledge 98 to pass through the axial opening 112 and the arcuate slot 114. The pivoting about point 126 is necessary since the diameter of the ledge is greater than the axial opening 112 but the width 128 of the arcuate slot 114 will effectively increase the diameter of the center opening of the backing plate in one direction to permit the passing of the backing plate 108 over the ledge 98. When the backing plate 108 has pivoted an angle equal to B, the backing plate will again be parallel to the vertical support 88. The backing plate 108 is now moved onto shoulder 96. Since the inner periphery 130 of the diaphragm 102 completely fills groove 94 and the area between land 100 and ledge 98, a tight fluid seal between the front chamber 24 and the rear chamber 26 will be created.

MODE OF OPERATION OF THE PREFERRED EMBODIMENT

In response to an actuation force, the lever arm 84 will pivot on pin 86 causing a force to be transmitted through valve control rod 54. This input force will cause plunger means 40 to slide on guide 44 permitting the flexible poppet member 60 to be urged onto seat 86 closing communication of vacuum through the first passage 34. Further movement of the valve control rod will move seat 58 away from poppet member 60 and allow air at atmospheric pressure to pass through the second passage 36 into the rear chamber 26. With air at atmospheric pressure and a partial vacuum in the front chamber 24, a pressure differential will be created across the wall means 22. This pressure differential acting over the area of the diaphragm 102 will develop an output force. This output force will be transferred through the backing plate 108 to the hub means 28 and reaction disc 50 to the output rod 48 to transmit an operational force, usually to a hydraulic piston, not shown.

We claim:

1. Wall means for dividing the interior of a housing of a servomotor of a predetermined diameter into a front and rear chamber, said wall means comprising:
   hub means having a central bore with a first passage connected to said front chamber and a second passage connected to said rear chamber, said hub means having an annular support extending radially from the exterior of the hub means on the end in the front chamber, said hub means having a groove located between said support and an annular ledge with a shoulder adjacent said support, said hub means having a transverse slot extending from the bottom of said groove into the central bore;
   a backing plate having an outer diameter corresponding to the diameter of the housing of the servomotor with an axial opening whose diameter is smaller than said annular ledge, said backing plate having a concentric slot extending from said axial opening to permit said backing plate to pass over said ledge and be set on said shoulder;
   valve means located in said central bore of the hub means for controlling the alternate communication of vacuum from the front chamber through the first passage and air at atmospheric pressure through said central bore to the rear chamber through the second passage to create an operational pressure differential in response to an actuation force;
   key means located in said transverse slot for retaining said valve means in said central bore;
   diaphragm means having an outer periphery secured to the housing of the servomotor and an inner periphery secured in said groove of the hub means for holding said key means in said transverse slot and for providing a uniform compressive force to urge said backing plate against said annular support to prevent movement therebetween, said operational pressure differential creating a force on said diaphragm means, said force being transferred through said diaphragm plate to cause said hub means to move.

2. The wall means, as recited in claim 1, further including:
   land means located on said hub means adjacent said shoulder corresponding to said concentric slot on said backing plate to prevent said backing plate from rotating on said shoulder.

3. The wall means, as recited in claim 2, wherein said land means is located adjacent said transverse slot in the hub means to provide a substantially planar surface with said backing plate to assure a sealable seat for said diaphragm means.

4. The wall means, as recited in claim 3, wherein said backing plate includes:
   a skirt secured to the outer diameter of said backing plate to provide a smooth surface for contacting said diaphragm means.

5. The wall means, as recited in claim 4, wherein said ledge prevents the diaphragm means from moving upon receiving an opposing force through the backing plate and hub means.

6. Wall means for dividing the interior of a housing of a servomotor of a predetermined diameter into a front and rear chamber, said wall means comprising:
   hub means for retaining an operational control valve responsive to an operator input to activate the servomotor, said hub means having an external periphery with a groove located therein between a shoulder and an annular ledge, said hub means having a support extending radially from said shoulder, said annular ledge having a larger diameter than said shoulder;
   a backing plate having an outer diameter corresponding to the diameter of the housing of the servomotor with an axial opening whose diameter is smaller than said annular ledge, said backing plate having a slot concentric to said axial opening to permit said backing plate to pass over said annular ledge and engage said shoulder; and
   diaphragm means having an outer periphery secured to the housing of the servomotor and an inner periphery secured in said groove of the hub means for providing a uniform compressive force to urge said backing plate against said annular support to prevent movement and form a fluid seal with said annular ledge upon movement of the wall means in the housing.

7. The wall means as recited in claim 6, further including:
land means located on said hub means adjacent said shoulder corresponding to said concentric slot on said backing plate to prevent said backing plate from rotating on said shoulder.

8. The wall means, as recited in claim 7, wherein said backing plate includes:
a skirt secured to the outer diameter of said backing plate to provide a smooth surface for contacting said diaphragm means.

9. The wall means, as recited in claim 8, wherein said ledge prevents the diaphragm means from moving upon receiving an opposing force through the backing plate and hub means.

* * * * *